US011536183B1

(12) United States Patent
Ott et al.

(10) Patent No.: US 11,536,183 B1
(45) Date of Patent: Dec. 27, 2022

(54) EXHAUST AFTERTREATMENT SUBSYSTEM

(71) Applicant: PACCAR Inc., Bellevue, WA (US)

(72) Inventors: Trevor Joseph Ott, Anacortes, WA (US); Cynthia Chaffin Webb, Sedro-Woolley, WA (US); Charles Wayne Reinhardt Swart, Bellingham, WA (US)

(73) Assignee: PACCAR Inc., Bellevue, WA (US)

( * ) Notice: Subject to any disclaimer, the term of this patent is extended or adjusted under 35 U.S.C. 154(b) by 0 days.

(21) Appl. No.: 17/482,261

(22) Filed: Sep. 22, 2021

(51) Int. Cl.
*F01N 11/00* (2006.01)
*F01N 3/20* (2006.01)

(52) U.S. Cl.
CPC .............. *F01N 11/00* (2013.01); *F01N 3/208* (2013.01); *F01N 3/2013* (2013.01); *F01N 2610/1453* (2013.01); *F01N 2900/1402* (2013.01)

(58) Field of Classification Search
CPC ........ F01N 11/00; F01N 3/2013; F01N 3/208; F01N 2610/1453; F01N 2900/1402
See application file for complete search history.

(56) References Cited

U.S. PATENT DOCUMENTS

2010/0293925 A1* 11/2010 Lahr ................... F02D 41/1463
60/276
2015/0033706 A1* 2/2015 Pfaffinger ............... F01N 11/00
60/276

* cited by examiner

*Primary Examiner* — Brandon D Lee
(74) *Attorney, Agent, or Firm* — Quinn IP Law

(57) ABSTRACT

An exhaust aftertreatment system and associated system for purifying an exhaust gas feedstream of a lean-burn engine includes an oxidation catalyst that is arranged upstream of a selective catalytic reduction (SCR) catalyst. A first NOx sensor is arranged upstream, and a second NOx sensor is arranged downstream of the oxidation catalyst. A controller is arranged to monitor the oxidation catalyst based upon inputs from the first and second NOx sensors. A first NOx parameter is determined via the first NOx sensor, and a second NOx parameter is determined via the second NOx sensor. An NO2 parameter is determined based upon the first NOx parameter, the second NOx parameter, a first relationship for the first and second NOx sensors, and a second relationship for the first and second NOx sensors. The NO2 production of the oxidation catalyst is evaluated based upon the NO2 parameter.

17 Claims, 2 Drawing Sheets

EXHAUST AFTERTREATMENT SUBSYSTEM

INTRODUCTION

Exhaust aftertreatment systems fluidly couple to internal combustion engines to purify exhaust gases that are generated as byproducts of combustion. Byproducts of combustion may include unburned hydrocarbons, carbon monoxide, nitrides of oxide (NOx), and particulate matter. Exhaust aftertreatment systems may include one of or combinations of oxidation catalysts, reduction catalysts, selective catalytic reduction catalysts, particulate filters, and other devices. When employed on heavy-duty diesel engines or other lean-burning configurations, an exhaust aftertreatment system may include a diesel oxidation catalyst (DOC) to oxidize nitric oxide (NO), a diesel particulate filter (DPF) for control of particulate matter (PM), one or more selective catalytic reduction (SCR) catalysts for NOx reduction, and/or an ammonia oxidation catalyst to eliminate or minimize ammonia slip. Operation of the internal combustion engine and the exhaust aftertreatment system may be monitored by one or more sensing devices that are disposed in the exhaust gas feedstream. Operation may also be determined employing simulation models that dynamically execute during operation.

SCR catalysts may employ reductants for reducing NOx molecules to elemental nitrogen. One reductant is urea, which may be transformed into ammonia (NH3) in an exhaust system. The reductant may be injected into the exhaust gas feedstream upstream of one or multiple selective catalytic reduction catalysts, and may be stored on a surface or otherwise captured for use in reducing NOx molecules to elemental nitrogen and water. Performance of known SCR catalysts is dependent upon temperature, with increased performance being related to increased exhaust gas temperatures.

There is a need to provide a hardware architecture implementation and method to monitor performance of elements of the exhaust aftertreatment system, including the DOC, to improve heavy-duty diesel NOx emissions.

SUMMARY

An exhaust aftertreatment system and associated system for purifying an exhaust gas feedstream of a lean-burn or other compression-ignition internal combustion engine is described. The system and method for purifying the exhaust gas feedstream includes an oxidation catalyst that is arranged upstream of a selective catalytic reduction (SCR) catalyst. A first NOx sensor is arranged to monitor the exhaust gas feedstream upstream of the oxidation catalyst, and a second NOx sensor is arranged to monitor the exhaust gas feedstream downstream of the oxidation catalyst and upstream of the SCR catalyst. A reductant delivery system is arranged to inject a reductant into the exhaust gas feedstream upstream of the SCR catalyst. A controller is operatively connected to the reductant delivery system and in communication with the first and second NOx sensors. The controller includes an instruction set that is executable to monitor the oxidation catalyst based upon inputs from the first and second NOx sensors. This includes determining a first relationship for the first and second NOx sensors corresponding to nitrogen oxide (NOx), and determining a second relationship for the first and second NOx sensors corresponding to nitrogen dioxide (NO2). A first NOx parameter is determined via the first NOx sensor, and a second NOx parameter is determined via the second NOx sensor. An NO2 parameter is determined based upon the first NOx parameter, the second NOx parameter, the first relationship for the first and second NOx sensors, and the second relationship for the first and second NOx sensors. The NO2 production of the oxidation catalyst is evaluated based upon the NO2 parameter.

An aspect of the disclosure includes the instruction set being executable to detect a fault in the oxidation catalyst when the NO2 parameter is greater than a first threshold.

Another aspect of the disclosure includes the instruction set being executable to detect a fault in the oxidation catalyst when the NO2 parameter is less than a second threshold.

Another aspect of the disclosure includes the instruction set being executable to determine NO2 production by the oxidation catalyst based upon the following relationship:

$$NO2_{DOC} = (1 + (Slope_{FTIR}/SlopeNOx_{NO2}))*(NOx_{S1} - NOx_{S2}), \text{ wherein:}$$

$NO2_{DOC}$ represents the NO2 production by the oxidation catalyst;

$Slope_{FTIR}$ represents the first relationship for the first and second NOx sensors;

$Slope_{NOxNO2}$ represents the second relationship for the first and second NOx sensors;

$NOx_{S1}$ represents the first NO parameter; and $NOx_{S2}$ represents the second NOx parameter.

Another aspect of the disclosure includes the first relationship for the first and second NOx sensors being based upon a magnitude of NOx molecules and a signal output.

Another aspect of the disclosure includes the second relationship for the first and second NOx sensors being based upon a magnitude of NO2 molecules in the exhaust gas feedstream.

Another aspect of the disclosure includes the instruction set being executable to monitor, via the second of the NOx sensors, the exhaust gas feedstream downstream of the oxidation catalyst and upstream of a successive exhaust aftertreatment device.

Another aspect of the disclosure includes an SCR catalyst and a reductant delivery system being arranged in the exhaust gas feedstream downstream of the first NOx sensor and upstream of the oxidation catalyst, wherein the instruction set is executable to deactivate the reductant delivery system prior to the determination of the NO2 parameter.

Another aspect of the disclosure includes the reductant delivery system being arranged to inject a gaseous ammonia into the exhaust gas feedstream upstream of the oxidation catalyst.

Another aspect of the disclosure includes a controllable heating element being arranged in the exhaust gas feedstream upstream of the SCR catalyst.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
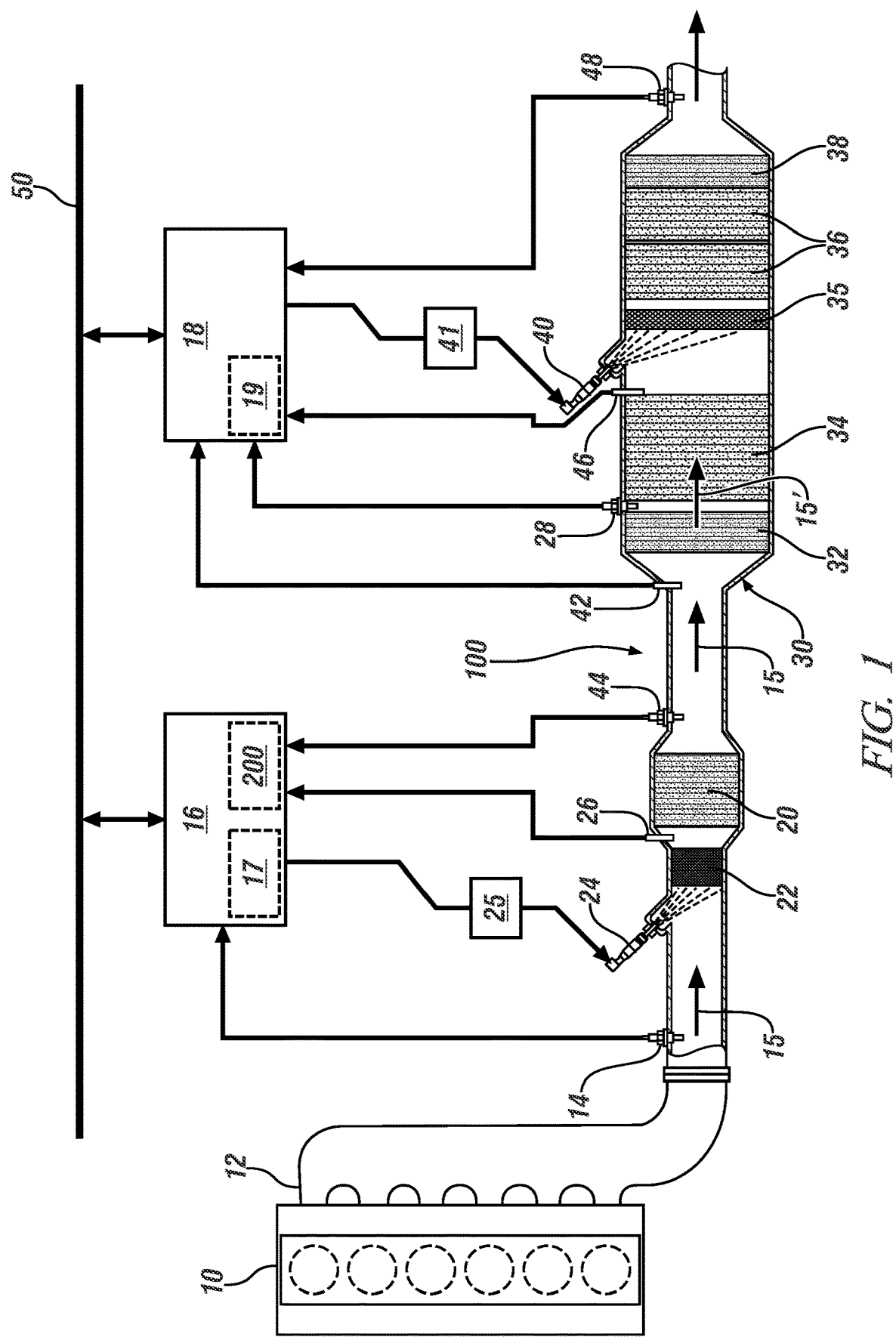
FIG. 1 schematically illustrates an internal combustion engine and an exhaust aftertreatment system, in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail to avoid unnecessarily obscuring the disclosure. Furthermore, the disclosure, as illustrated and described herein, may be practiced in the absence of an element that is not specifically disclosed herein.

The following detailed description is merely exemplary in nature and is not intended to limit the application and uses. Furthermore, there is no intention to be bound by any expressed or implied theory presented herein. Throughout the drawings, corresponding reference numerals indicate like or corresponding parts and features. As used herein, the terms "system" and "subsystem" may refer to one of or a combination of mechanical and electrical devices, actuators, sensors, controllers, application-specific integrated circuits (ASIC), combinatorial logic circuits, software, firmware, and/or other components that are arranged to provide the described functionality. As employed herein, the term "upstream" and related terms refer to elements that are towards an origination of a flow stream relative to an indicated location, and the term "downstream" and related terms refer to elements that are away from an origination of a flow stream relative to an indicated location. The term 'model' refers to a processor-based or processor-executable code and associated calibration that simulates a physical existence of a device or a physical process. The use of ordinals such as first, second and third does not necessarily imply a ranked sense of order, but rather may only distinguish between multiple instances of an act or structure.

Referring to the drawings, wherein like reference numerals correspond to like or similar components throughout the several Figures, FIG. 1, consistent with embodiments disclosed herein, schematically illustrates elements of an embodiment of an exhaust aftertreatment system 100 for purifying the exhaust gas feedstream 15 of an internal combustion engine 10, wherein the internal combustion engine 10 is controlled to operate primarily in a lean-burn air/fuel ratio combustion environment. The exhaust aftertreatment system 100 is configured to purify the exhaust gas feedstream 15 to achieve target tailpipe emissions in-use.

One example of the internal combustion engine 10 is a multi-cylinder compression-ignition internal combustion engine that is classified as a heavy-duty (HD) engine. In one embodiment, the internal combustion engine 10 is disposed on a vehicle. The vehicle may include, but not be limited to a mobile platform in the form of a heavy-duty commercial vehicle, an industrial vehicle, an agricultural vehicle, a watercraft, or a train. Alternatively, the internal combustion engine 10 may be arranged as a stationary device, such as for powering an electric power generator.

The exhaust gas feedstream 15 generated by the internal combustion engine 10 may contain various byproducts of combustion, including unburned hydrocarbons, carbon monoxide, nitrides of oxide (NOx), particulate matter, etc. The exhaust gas feedstream 15 is monitored by an engine-out exhaust gas sensor 14, which is a NOx sensor in one embodiment. The engine-out exhaust gas sensor 14 monitors NOx constituents in the exhaust gas feedstream 15 for purposes of monitoring and/or controlling operation of the engine 10 and monitoring one or more elements of the exhaust aftertreatment system 100. In addition, there may be one or more other engine-out exhaust gas sensors (not shown) that monitor one or constituents of the exhaust gas feedstream 15, including, e.g., a second NOx sensor, a wide-range air/fuel ratio sensor, a temperature sensor, etc.

Engine control includes controlling various engine operating parameters, including controlling engine control states to minimize various exhaust gas constituents through chemical reaction processes that include, by way of non-limiting examples, oxidation, reduction, filtering, and selective reduction. Other engine control states include controlling operating parameters to warm up the engine 10 and control heat transfer to various elements of the exhaust aftertreatment system 100 to effect efficacious operation thereof. Heat transfer to the elements of the exhaust aftertreatment system 100 may be employed for warmup and catalyst light-off, regeneration of a particulate filter, etc.

The exhaust aftertreatment system 100 includes, in one embodiment, a first selective catalytic reduction (SCR) catalyst 20 that is arranged upstream of an exhaust subsystem 30. In some embodiments, the exhaust aftertreatment system 100 includes only the exhaust subsystem 30.

When the exhaust aftertreatment system 100 includes only the exhaust subsystem 30, it is configured to purify the exhaust gas feedstream 15 of the internal combustion engine 10 to achieve a first tailpipe emissions target in-use. When the exhaust aftertreatment system 100 includes the first SCR catalyst 20 upstream of the exhaust subsystem 30, it is configured to purify the exhaust gas feedstream 15 to achieve a second tailpipe emissions target in-use, wherein the second tailpipe emissions target is less than the first tailpipe emissions target that is achievable with the exhaust subsystem 30 alone. The tailpipe emissions targets may be in the form of regulatory emissions targets that are imposed by the US Environmental Protection Agency, the California Air Resources Board, the European Union, or other regulatory bodies. The tailpipe emissions targets may instead be in the form of in-house or user emissions targets, such as may be imposed by a private fleet owner.

The first SCR catalyst 20 may be placed in an engine compartment in an underhood location, and thus may be closely coupled to the engine 10. The first SCR catalyst 20 may be fluidly coupled to an exhaust manifold 12 of the engine 10, or to a fluid outlet of a turbocharger or supercharger of the engine 10. Alternatively, the first SCR catalyst 20 may be located underbody.

A first reductant delivery system 25 is arranged to inject a reductant into the exhaust gas feedstream upstream of the first SCR catalyst 20. Operation of the first reductant delivery system 25 may be controlled by a first controller 16. The first reductant delivery system 25 includes, in one embodiment, a single reductant injector 24 having an injection nozzle that is positioned to inject reductant into the exhaust gas feedstream upstream of the first SCR catalyst 20. The first reductant delivery system 25 is configured to controllably supply a metered flow of reductant into the exhaust gas feedstream upstream of the first SCR catalyst 20 to facilitate NOx reduction therethrough. The first controller 16 is operatively connected to the first reductant delivery system 25 and in communication with the first NOx sensor 14 and the first temperature sensor 26. The first controller 16 includes a first instruction set 17 that is executable to control the first reductant delivery system 25 to inject reductant into the exhaust gas feedstream 15 upstream of the first SCR catalyst 20 based upon inputs from the engine-out NOx sensor 14, and a second, downstream NOx sensor 48 that is arranged to monitor the exhaust gas feedstream at the tailpipe downstream of the exhaust subsystem 30, and other sensors.

In one embodiment, a first heating device 22 is arranged to transfer heat to the exhaust gas feedstream upstream of the first SCR catalyst 20. In one embodiment, the first heating device 20 is a controllable heating element that is arranged in the exhaust gas feedstream 15 upstream of the first SCR catalyst 20. The first heating device 22 may be an electrically-powered resistive heater or heating element, a burner, or another heater, to inject heat energy into the exhaust gas flow and the injected reductant. In one embodiment, a first temperature sensor 26 is arranged to monitor temperature of the exhaust gas feedstream 15 upstream of the first SCR catalyst 20. In one embodiment, a third exhaust gas sensor 44 is arranged to monitor the exhaust gas feedstream 15 downstream of the first SCR catalyst 20. In one embodiment, the third exhaust gas sensor 44 monitors constituents in the exhaust gas feedstream 15 for purposes of monitoring and/or controlling operation of the engine 10 and/or the first reductant delivery system 25. The third exhaust gas sensor 44 may be configured to monitor one or constituents of the exhaust gas feedstream 15, including, e.g., NOx sensor, a wide-range air/fuel, etc. In one embodiment, a second oxidation catalyst (not shown) is arranged upstream of the first SCR catalyst 20. The first controller 16 interfaces and communicates with other controllers e.g., second controller 18 and an engine controller, via a communication bus 50.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, e.g., communication bus 50, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

In one embodiment, the first SCR catalyst 20 is a catalytic device that employs a reductant to reduce NOx molecules to form elemental nitrogen (N2) and other inert gases. In one embodiment, the reductant is urea, which can be converted to ammonia (NH3) that is stored on the substrate of the first SCR catalyst 20. Alternatively, the reductant may be gaseous ammonia. The first SCR catalyst 20 includes a ceramic or metallic substrate having flow channels that have been coated with suitable materials that include by way of non-limiting examples: metals, such as vanadium, copper, cerium, and/or other materials. The coated materials effect chemical reactions to reduce, in the presence of ammonia, NOx molecules in the exhaust gas feedstream to form elemental nitrogen (N2) and other inert gases, under certain conditions of the exhaust gas feedstream related to temperature, flowrate, air/fuel ratio and others.

The exhaust subsystem 30 includes a plurality of fluidly connected exhaust purifying devices for purifying engine exhaust gas prior to expulsion out the tailpipe to ambient air. An exhaust purifying device is a device that is configured to oxidize, reduce, filter and/or otherwise treat constituents of the exhaust gas feedstream 15, including but not limited to hydrocarbons, carbon monoxide, nitrides of oxygen (NOx), particulate matter, and ammonia. In the non-limiting embodiment shown, first, second, third, and fourth exhaust purifying devices 32, 34, 36, and 38, respectively, are arranged in series.

The first exhaust purifying device 32 is an oxidation catalyst for oxidizing NO and other constituents in the exhaust gas feedstream 15, in certain embodiments, and is referred to hereafter as an oxidation catalyst 32.

The second exhaust purifying device 34 is a particulate filter for filtering particulate matter from the exhaust gas feedstream, in one embodiment.

The third exhaust purifying device 36 is a selective catalyst reduction (SCR) catalyst, i.e., a second SCR catalyst 36 in one embodiment. In one embodiment, the second SCR catalyst 36 is a urea-based device that employs gaseous ammonia to react with and reduce NOx molecules to form elemental nitrogen (N2) and other inert gases. The injected reductant may be urea, which can be converted to ammonia (NH3), and stored on the substrate of the second SCR catalyst 36 to react with and reduce NOx molecules. A second reductant delivery system 41 is arranged to inject reductant into the exhaust gas feedstream 15' upstream of the second SCR catalyst 36.

In one embodiment, a second heating device 35 may be interposed in the exhaust gas feedstream downstream of the second exhaust purifying device 34 and upstream of the third exhaust purifying device 36, and may be, in one embodiment, an electrically-powered resistive heater or heating element, a burner, or another heater, to inject heat energy into the exhaust gas flow and the injected reductant.

The fourth exhaust purifying device 38 may be an ammonia oxidation catalyst that is arranged downstream of the second SCR catalyst 36, and operates to oxidize unused ammonia from the second SCR catalyst 36 to eliminate or minimize ammonia slip in one embodiment.

The second reductant delivery system 41 includes, in one embodiment, a second reductant injector 40 having an injection nozzle that is positioned to inject reductant into the exhaust gas feedstream downstream of the second exhaust purifying device 34, i.e., the particulate filter, and upstream of the second SCR catalyst 36. The second reductant delivery system 41 is configured to controllably supply a metered flow of reductant into the exhaust gas feedstream 15' upstream of the second SCR catalyst 36 to facilitate NOx reduction through the second SCR catalyst 36.

Operation of the second reductant delivery system 41 may be controlled by a second controller 18. The second reductant delivery system 41 is configured to controllably supply a metered flow of reductant into the exhaust gas feedstream upstream of the second SCR catalyst 36 to facilitate NOx reduction therethrough. The second controller 18 is operatively connected to the second reductant delivery system 41 and in communication with the second NOx sensor 28, a second temperature sensor 42, and a third temperature sensor 46. The second controller 18 includes a second instruction set 19 that is executable to control the second reductant delivery system 41 to inject reductant into the exhaust gas feedstream 15' upstream of the second SCR catalyst 36 based upon inputs from the various sensors.

Each of the first, second, third, and fourth exhaust purifying devices 32, 34, 36, and 38, respectively, includes a ceramic or metallic substrate having flow channels that have been coated with suitable materials that include by way of non-limiting examples: platinum-group metals such as platinum, palladium and/or rhodium; other metals, such as vanadium, copper, cerium, and/or other materials. The coated materials effect chemical reactions to oxidize, reduce, filter, or otherwise treat constituents of the exhaust gas feedstream under certain conditions related to temperature, flowrate, air/fuel ratio and others. The embodiment shown includes the elements of the exhaust aftertreatment system 100 in one arrangement, which is illustrative. Other arrangements of the elements of the exhaust aftertreatment system 100 may be employed within the scope of this disclosure, with such arrangements including the addition of other exhaust purifying devices and/or omission of one or more of the exhaust purifying devices, depending upon requirements of the specific application.

The sensors for monitoring the various exhaust purifying devices of the exhaust subsystem 30 include a tailpipe exhaust gas sensor 48 and temperature sensors 42, 46. Other sensors (not shown) may include, for example, a particulate matter sensor, a delta pressure sensor for monitoring pressure drop across the SCR catalyst 36, additional temperature sensors, and/or other sensing devices and models for monitoring the exhaust gas feedstream. The tailpipe exhaust gas sensor 48 may be a NOx sensor, and in one embodiment may have wide-range air/fuel ratio sensing capability. Such sensors and models may be arranged to monitor or otherwise determine parameters relegated to the exhaust gas feedstream at specific locations. As such, the aforementioned sensors and/or models may be advantageously employed to monitor performance of individual ones of the exhaust purifying devices, monitor parameters associated with performance of a subset of the exhaust purifying devices, or monitor parameters associated with performance of the exhaust aftertreatment system 100.

The first controller 16 includes the first instruction set 17 that is executable to control the first reductant delivery system 25 to inject the reductant into the exhaust gas feedstream 15 upstream of the first SCR catalyst 20, on systems that employ the first reductant delivery system 25. This includes the first instruction set 17 being executed to control the first reductant delivery system 25 to inject the reductant into the exhaust gas feedstream 15 upstream of the first SCR catalyst 20 to achieve a target reductant/NOx ratio that is input to the first SCR catalyst 20 to achieve a first target NOx reduction level, on systems that employ the first reductant delivery system 25. Alternatively, or in addition, the first controller 16 controls, via the first instruction set 17, the first reductant delivery system 25 to inject the reductant into the exhaust gas feedstream 15 upstream of the first SCR catalyst 20 to achieve a target ammonia storage level on the first SCR catalyst 20 in anticipation of a projected need for NOx reduction, and as part of controlling the exhaust gas feedstream that is input to the exhaust aftertreatment system 100.

The second controller 18 includes the second instruction set 19 that is executable to control the second reductant delivery system 41 to inject the reductant into the exhaust gas feedstream 15' upstream of the second SCR catalyst 36, on systems that employ the second reductant delivery system 41. The second instruction set 19 is executed to control the second reductant delivery system 41 to inject the reductant into the exhaust gas feedstream 15' upstream of the second SCR catalyst 36 to achieve a target reductant/NOx ratio that is input to the second SCR catalyst 36 to achieve a second target NOx reduction level. Alternatively, or in addition, the second controller 18 controls, via the second instruction set 19, the second reductant delivery system 41 to inject the reductant into the exhaust gas feedstream 15' upstream of the second SCR catalyst 36 to achieve a target ammonia storage level on the second SCR catalyst 36 in anticipation of a projected need for NOx reduction, and as part of controlling the exhaust gas feedstream that is input to the exhaust aftertreatment system 100.

Figure 2:
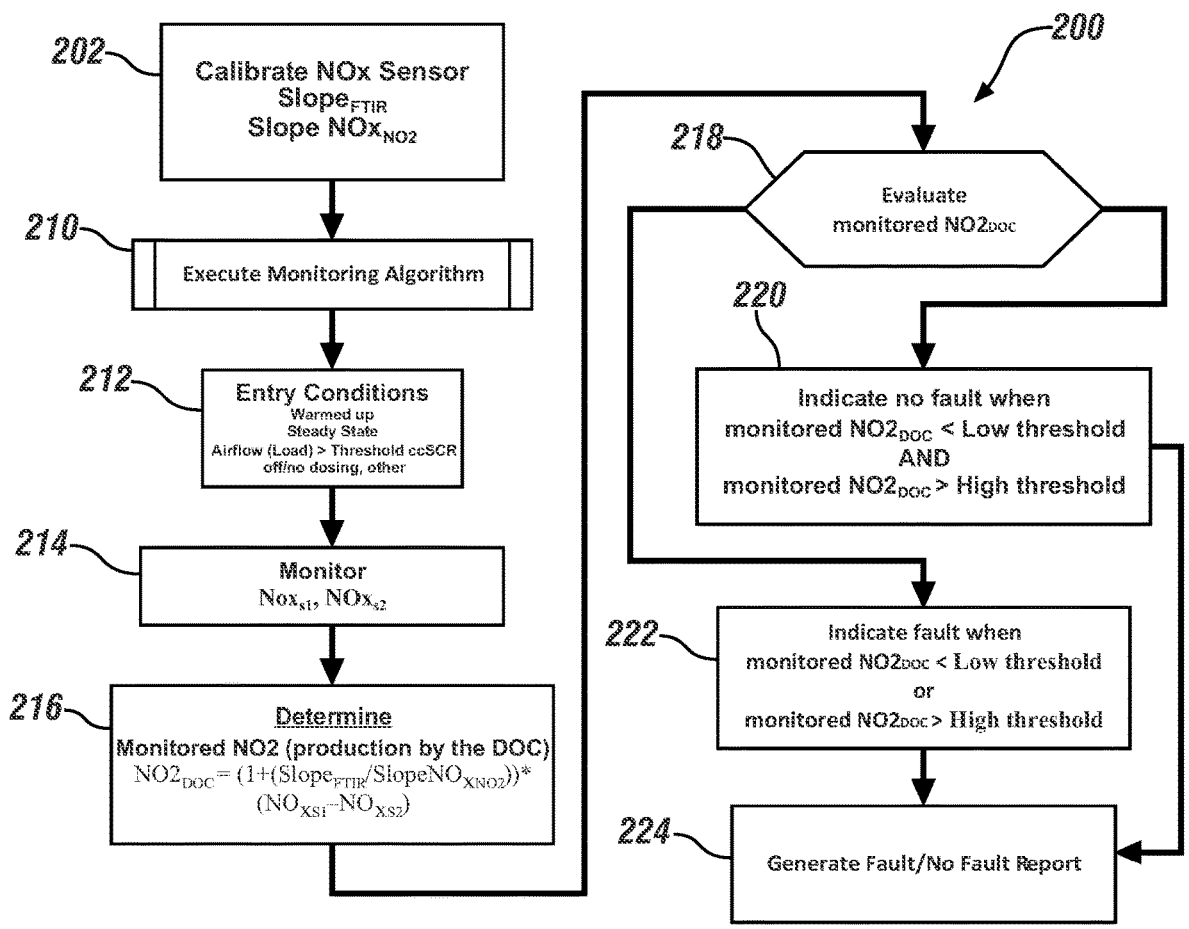
FIG. 2 schematically illustrates a flowchart for a control routine to monitor an oxidation catalyst that is arranged upstream of an SCR catalyst of an embodiment of an exhaust aftertreatment system, in accordance with the disclosure.

Referring now to FIG. 2 with continued reference to an embodiment of the exhaust aftertreatment system 100 that is described with reference to FIG. 1, a method, algorithm and/or control routine 200 for monitoring the oxidation catalyst 32 is described. The concepts of the control routine 200 may be applied to operation of various embodiments of an exhaust aftertreatment system for an internal combustion engine operating in a lean air/fuel ratio environment that has an oxidation catalyst arranged upstream of an SCR catalyst, and are not limited to the exhaust aftertreatment system 100 that is described with reference to FIG. 1. The control routine 200 may be implemented as algorithmic code that is executable by the first controller 16 in one embodiment.

The overall concept of the control routine 200 is to monitor the exhaust gas feedstream employing a first NOx sensor that is arranged upstream of the oxidation catalyst 32 and a second NOx sensor that is arranged downstream of the oxidation catalyst 32, under steady-state, warmed up operating conditions. Information from the first and second NOx sensors is employed by the control routine 200 to evaluate the capability of the oxidation catalyst 32 to oxidize NO to form NO2. In one embodiment, the first NOx sensor is the engine-out NOx sensor 14. Alternatively, the first NOx sensor may be the third NOx sensor 44 that is arranged downstream of the first SCR catalyst 20 (when employed), under operating conditions that include the first reductant delivery system 25 being deactivated or otherwise disabled. In one embodiment, the second NOx sensor is the second NOx sensor 28 that is disposed to monitor the exhaust gas feedstream 15' downstream of the oxidation catalyst 32.

The oxidation catalyst 32 oxidizes NO in the exhaust gas feedstream to form NO2. The result is an increased NO2/NOx ratio as compared to the engine-out NO2/NOx ratio. The increased NO2/NOx ratio improves SCR conversion efficiency in a downstream SCR catalyst in the presence of a reductant, up to an optimum point. However, when the NO2/NOx ratio is greater than the optimum point, there is a negative effect on NOx conversion efficiency in the downstream SCR catalyst. Evaluating the capability of the oxidation catalyst 32 to oxidize NO facilitates determining the capability of the exhaust aftertreatment system 100 to convert NOx emissions to N2 and oxygen.

The first and second NOx sensors have a first sensitivity to NO, and a second, lesser sensitivity to NO2. The lesser sensitivity to NO2 can be used by the control routine 200 to determine NO2 production by the DOC.

Figure 3:
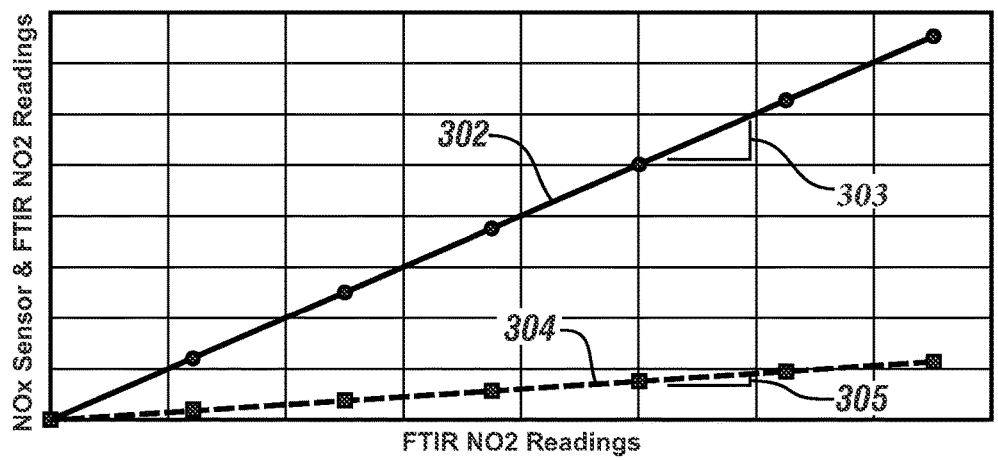
FIG. 3 graphically illustrates a signal output of a NOx sensor in relation to NO2 in a gas feedstream, in accordance with the disclosure.

FIG. 3 graphically shows relationships and hence sensitivities of the first and second NOx sensors in relation to NO2. The vertical axis and the horizontal axis show NO2. Line 302 graphically illustrates an absolute measurement of NO2, e.g., as measured using an infrared sensor. Thus line 302 has a first slope 303 that is 1/1. Line 304 graphically illustrates a signal output of one of the first and second NOx sensors, in relation to a change in NO2. Line 304 has a second slope 305. As shown, the sensitivity of the NOx sensor to a change in NO2, i.e., the second slope 305, is less than the absolute measurement of NO2 as indicated by the first slope 303.

With the NO and NO2 sensitivity of the NOx sensor known, the change in NOx sensor measurements can be used to determine the NO2 production of the DOC when there is no NOx reduction between the first and second NOx sensors.

Referring again to FIG. 2, the control routine 200 for monitoring the oxidation catalyst 32 proceeds as follows. The relationships and hence sensitivities of the first and second NOx sensors to NO2, i.e., first and second slopes 303 and 305, are determined and captured as NOx sensor calibrations that are stored in the second controller 18 (Step 202). The NOx sensor calibrations may be in the form of equations, lookup tables, etc., that are accessible by the first controller 16.

Execution of the monitoring algorithm 210 includes monitoring entry conditions to determine whether the exhaust aftertreatment system 100 is in condition to execute the monitoring algorithm 210 to achieve an accurate result (Step 212). The entry conditions include, by way of non-limiting examples, determining that the exhaust aftertreatment system 100 is in a warmed-up, steady-state condition, determining that the engine load, as indicated by airflow, is greater than a minimum threshold, and determining that the upstream reductant delivery system, e.g., the first reductant delivery system 25, has been deactivated.

When the entry conditions are satisfied, signal outputs of the first and second NOx sensors 14, 28 are monitored to determine first and second NOx parameters, respectively. (Step 214).

The monitoring algorithm 210 determines NO2 production of the oxidation catalyst 32 based upon the following relation:

$$NO2_{DOC}=(1+(Slope_{FTIR}/SlopeNOx_{NO2}))*(NOx_{S1}-NOx_{S2}),\quad [1]$$

wherein:
$NO2_{DOC}$ represents the NO2 production by the oxidation catalyst 32;
$Slope_{FTIR}$ represents the first relationship for the first and second NOx sensors, i.e., slope 303;
$Slope_{NOxNO2}$ represents the second relationship for the first and second NOx sensors, i.e., slope 305;
$NOx_{S1}$ represents the first NOx parameter; and
$NOx_{S2}$ represents the second NOx parameter. (Step 216)

The monitoring algorithm 210 may employ the NO2 production, i.e., $NO2_{DOC}$ representing the NO2 production by the oxidation catalyst 32 that is determined via EQ. 1, as a feedback parameter that may be employed by the first instruction set 17 to control the first reductant delivery system 25 to inject the reductant into the exhaust gas feedstream 15 upstream of the first SCR catalyst 20 to achieve a target reductant/NOx ratio that is input to the first SCR catalyst 20 to achieve a first target NOx reduction level and/or to achieve a target ammonia storage level, on systems that employ the first reductant delivery system 25.

The monitoring algorithm 210 may employ the NO2 production, i.e., $NO2_{DOC}$ representing the NO2 production by the oxidation catalyst 32 that is determined via EQ. 1, as a feedback parameter that may be employed by the second instruction set 19 to control the second reductant delivery system 41 to inject reductant into the exhaust gas feedstream 15' upstream of the second SCR catalyst 36 to achieve a target reductant/NOx ratio that is input to the second SCR catalyst 36 to achieve a second target NOx reduction level and/or to achieve a target ammonia storage level.

The monitoring algorithm 210 further evaluates the NO2 production of the oxidation catalyst 32 by comparing it with an upper threshold and a lower threshold (Step 218).

The lower threshold for NO2 production of the oxidation catalyst 32 is based upon catalyst characteristics that are determined by testing and calibration during development.

The upper threshold for NO2 production of the oxidation catalyst 32 is determined based upon catalyst characteristics that are determined by testing and calibration during development.

When the NO2 production of the oxidation catalyst 32 is greater than the lower threshold and less than the upper threshold (Step 220), it indicates absence of a fault in the oxidation catalyst 32, and this iteration of the control routine 200 ends.

When the NO2 production of the oxidation catalyst 32 is greater than the upper threshold, or less than the lower threshold (Step 222), it indicates a potential occurrence of a fault associated with the oxidation catalyst 32. Various operating conditions related to the internal combustion engine 10 and the exhaust aftertreatment system 100 may be captured and stored in the second controller 18 for further evaluation and for use in root cause analysis.

The second controller 18 can generate an oxidation catalyst fault report indicating either an absence of a fault in the oxidation catalyst 32 (No Fault), or a potential occurrence of a fault associated with the oxidation catalyst 32 (Fault) (Step 224). The oxidation catalyst fault report may be communicated to another on-board controller, and then to a vehicle operator via a dashboard indicator lamp. The oxidation catalyst fault report may be communicated to a diagnostic scan tool, such as in response to an inquiry. The oxidation catalyst fault report may be communicated, via wireless communication, to a remotely-located controller that may employ the information for purposes of vehicle and fleet management. The vehicle may be scheduled for service for purposes of further diagnostics and repair in response to the potential occurrence of a fault associated with the oxidation catalyst 32. In this manner, an oxidation catalyst for an embodiment of an exhaust aftertreatment system of a lean-burn internal combustion engine may be regularly and periodically monitored employing upstream and downstream NOx sensors to detect occurrence of a fault.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A method for monitoring an oxidation catalyst that is arranged in an exhaust gas feedstream of a compression-ignition internal combustion engine, the method comprising:
arranging a first NOx sensor to monitor the exhaust gas feedstream upstream of the oxidation catalyst, and arranging a second NOx sensor to monitor the exhaust gas feedstream downstream of the oxidation catalyst;
determining a first relationship for the first and second NOx sensors corresponding to nitrogen oxide (NOx);
determining a second relationship for the first and second NOx sensors corresponding to nitrogen dioxide (NO2);
determining, via the first NOx sensor, a first NOx parameter;
determining, via the second NOx sensor, a second NOx parameter;
determining an NO2 parameter based upon the first NOx parameter, the second NOx parameter, the first relationship for the first and second NOx sensors, and the second relationship for the first and second NOx sensors;
evaluating NO2 production of the oxidation catalyst based upon the NO2 parameter; and
communicating, via a controller, the evaluating of the NO2 production of the oxidation catalyst wherein determining the NO2 parameter based upon the first NOx parameter, the second NOx parameter, the first relationship for the first and second NOx sensors, and the second relationship for the first and second NOx sensors comprises determining NO2 production by the oxidation catalyst based upon the following relationship:

$$NO2DOC=(1+(SlopeFTIR/SlopeNOxNO2))*(NOxs1-NOxs2)$$

wherein:
NO2DOC represents the NO2 production by the oxidation catalyst;
SlopeFTIR represents the first relationship for the first and second NOx sensors;
SlopeNOxNO2 represents the second relationship for the first and second NOx sensors;
NOxs1 represents the first NOx parameter; and
NOxs2 represents the second NOx parameter.

2. The method of claim 1, wherein evaluating the NO2 production of the oxidation catalyst based upon the NO2 parameter comprises detecting a fault in the oxidation catalyst when the NO2 parameter is greater than a first threshold.

3. The method of claim 1, wherein evaluating the NO2 production of the oxidation catalyst based upon the NO2 parameter comprises detecting a fault in the oxidation catalyst when the NO2 parameter is less than a second threshold.

4. The method of claim 1, further comprising a selective catalytic reduction (SCR) catalyst and a reductant delivery system arranged in the exhaust gas feedstream downstream of the first NOx sensor and upstream of the oxidation catalyst; and
wherein the method further comprises employing the NO2 parameter as a feedback parameter to control the reductant delivery system to inject reductant into the exhaust gas feedstream to achieve a target reductant/NOx ratio.

5. The method of claim 1, wherein the first relationship for the first and second NOx sensors is based upon a magnitude of NOx molecules in the exhaust gas feedstream.

6. The method of claim 1, wherein the second relationship for the first and second NOx sensors is based upon a magnitude of NO2 molecules in the exhaust gas feedstream.

7. The method of claim 1, further comprising monitoring, via the second of the NOx sensors, the exhaust gas feedstream downstream of the oxidation catalyst and upstream of a successive exhaust aftertreatment device.

8. A system for monitoring an oxidation catalyst arranged in an exhaust gas feedstream of a compression-ignition internal combustion engine, comprising:
a first NOx sensor arranged to monitor the exhaust gas feedstream upstream of the oxidation catalyst;
a second NOx sensor arranged to monitor the exhaust gas feedstream downstream of the oxidation catalyst;
a controller, in communication with the first and second NOx sensors;
the controller including an instruction set, the instruction set including:
a first relationship for the first and second NOx sensors corresponding to nitrogen oxide (NOx);
a second relationship for the first and second NOx sensors corresponding to nitrogen dioxide (NO2);
wherein the instruction set is executable to:
determine, via the first NOx sensor, a first NOx parameter;
determine, via the second NOx sensor, a second NOx parameter;
determine an NO2 parameter based upon the first NOx parameter, the second NOx parameter, the first relationship for the first and second NOx sensors, and the second relationship for the first and second NOx sensors;
evaluate NO2 production of the oxidation catalyst based upon the NO2 parameter; and
communicate the evaluating of the NO2 production of the oxidation catalyst to a second controller wherein the instruction set being executable to determine the NO2 parameter based upon the first NOx parameter, the second NOx parameter, the first relationship for the first and second NOx sensors, and the second relationship for the first and second NOx sensors comprises the instruction set being executable to determine NO2 production by the oxidation catalyst based upon the following relationship:

$$NO2DOC=(1+(SlopeFTIR/SlopeNOxNO2))*(NOxs1-NOxs2)$$

wherein:
NO2DOC represents the NO2 production by the oxidation catalyst;
SlopeFTIR represents the first relationship for the first and second NOx sensors;

SlopeNOxNO2 represents the second relationship for the first and second NOx sensors;

NOxs1 represents the first NOx parameter; and

NOxs2 represents the second NOx parameter.

9. The system of claim 8, wherein the instruction set being executable to evaluate the NO2 production of the oxidation catalyst based upon the NO2 parameter comprises the instruction set being executable to detect a fault in the oxidation catalyst when the NO2 parameter is greater than a first threshold.

10. The system of claim 8, wherein the instruction set being executable to evaluate the NO2 production of the oxidation catalyst based upon the NO2 parameter comprises the instruction set being executable to detect a fault in the oxidation catalyst when the NO2 parameter is less than a second threshold.

11. The system of claim 8, wherein the first relationship for the first and second NOx sensors is based upon a magnitude of NOx molecules in the exhaust gas feedstream.

12. The system of claim 8, wherein the second relationship for the first and second NOx sensors is based upon a magnitude of NO2 molecules in the exhaust gas feedstream.

13. The system of claim 8, further comprising the instruction set being executable to monitor, via the second of the NOx sensors, the exhaust gas feedstream downstream of the oxidation catalyst and upstream of a successive exhaust aftertreatment device.

14. The system of claim 8, further comprising a selective catalytic reduction (SCR) catalyst and a reductant delivery system arranged in the exhaust gas feedstream downstream of the first NOx sensor and upstream of the oxidation catalyst; and wherein the instruction set is executable to employ the NO2 parameter as a feedback parameter to control the reductant delivery system to inject reductant into the exhaust gas feedstream to achieve a target reductant/NOx ratio.

15. The system of claim 14, wherein the instruction set is executable to deactivate the reductant delivery system prior to the determination of the NO2 parameter.

16. The system of claim 14, further comprising a controllable heating element arranged in the exhaust gas feedstream upstream of the SCR catalyst.

17. A system for monitoring an oxidation catalyst for a lean-burn internal combustion engine, comprising:

a first NOx sensor arranged to monitor an exhaust gas feedstream upstream of the oxidation catalyst;

a second NOx sensor arranged to monitor the exhaust gas feedstream downstream of the oxidation catalyst;

a controller, in communication with the first and second NOx sensors;

the controller including an instruction set, the instruction set including:

a first relationship for the first and second NOx sensors corresponding to nitrogen oxide (NOx); and a second relationship for the first and second NOx sensors corresponding to nitrogen dioxide (NO2);

wherein the instruction set is executable to:

determine, via the first NOx sensor, a first NOx parameter;

determine, via the second NOx sensor, a second NOx parameter;

determine an NO2 parameter based upon the first NOx parameter, the second NOx parameter, the first relationship for the first and second NOx sensors, and the second relationship for the first and second NOx sensors;

determine NO2 production by the oxidation catalyst based upon the NO2 parameter; and detect a fault in the oxidation catalyst based upon the NO2 production wherein the instruction set being executable to determine the NO2 parameter based upon the first NOx parameter, the second NOx parameter, the first relationship for the first and second NOx sensors, and the second relationship for the first and second NOx sensors comprises the instruction set being executable to determine NO2 production by the oxidation catalyst based upon the following relationship:

$$NO2DOC = (1 + (SlopeFTIR/SlopeNOxNO2)) * (NOxs1 - NOxs2)$$

wherein:

NO2DOC represents the NO2 production by the oxidation catalyst;

SlopeFTIR represents the first relationship for the first and second NOx sensors;

SlopeNOxNO2 represents the second relationship for the first and second NOx sensors;

NOxs1 represents the first NOx parameter; and

NOxs2 represents the second NOx parameter.

* * * * *